(12) United States Patent
Lu

(10) Patent No.: US 8,982,163 B2
(45) Date of Patent: Mar. 17, 2015

(54) TECHNIQUES FOR DYNAMICALLY REGULATING DISPLAY IMAGES FOR AMBIENT VIEWING CONDITIONS

(76) Inventor: Xiaopeng Lu, Beijing (CN)

(*) Notice: Subject to any disclaimer, the term of this patent is extended or adjusted under 35 U.S.C. 154(b) by 307 days.

(21) Appl. No.: 13/337,058

(22) Filed: Dec. 24, 2011

(65) Prior Publication Data

US 2012/0092393 A1 Apr. 19, 2012
US 2015/0054858 A9 Feb. 26, 2015

(30) Foreign Application Priority Data

Jun. 25, 2009 (CN) .......................... 2009 1 0087669

(51) Int. Cl.
*G09G 5/10* (2006.01)
*H04N 5/58* (2006.01)
*H04N 21/414* (2011.01)
*H04N 21/422* (2011.01)
*H04N 21/431* (2011.01)

(52) U.S. Cl.
CPC ........... *H04N 5/58* (2013.01); *H04N 21/41407* (2013.01); *H04N 21/42202* (2013.01); *H04N 21/4318* (2013.01)
USPC ........................................................ 345/690

(58) Field of Classification Search
None
See application file for complete search history.

(56) References Cited

U.S. PATENT DOCUMENTS

| 2005/0057485 | A1* | 3/2005 | Diefenbaugh | ................ 345/102 |
| 2008/0204481 | A1* | 8/2008 | Mostinski | ..................... 345/690 |
| 2009/0195551 | A1* | 8/2009 | Quan | ............................ 345/600 |
| 2011/0074803 | A1* | 3/2011 | Kerofsky | ...................... 345/589 |
| 2011/0187733 | A1* | 8/2011 | Sun et al. | ..................... 345/589 |

* cited by examiner

*Primary Examiner* — Christopher R Lamb
(74) *Attorney, Agent, or Firm* — Zareefa B. Flener; Flener IP Law

(57) ABSTRACT

Techniques pertaining to dynamically regulating brightness of backlighting in display devices are disclosed. According to one aspect of the present invention, the brightness dynamic range of a display device is adjusted according to the current ambient viewing conditions. In order words, the original brightness dynamic range of the display image is mapped to the brightness dynamic range suitable for human eyes under the current ambient viewing conditions. The brightness of the display image is corrected according to a histogram to enhance the contrast and details of the display image, thereby a high quality displayed image can be presented under the current ambient viewing conditions.

9 Claims, 2 Drawing Sheets

201 — obtain a brightness dynamic range suitable for human eyes under current environment is determined according to current environmental brightness and an original brightness dynamic range of a display image 202 — regulate original brightness value of each pixel of the display image into a regulated brightness value suitable for the human eyes under the current environment 203 — correct the regulated brightness value of each pixel of the display image is a corrected brightness value according to a histogram of the regulated brightness value of the display image

TECHNIQUES FOR DYNAMICALLY REGULATING DISPLAY IMAGES FOR AMBIENT VIEWING CONDITIONS

BACKGROUND OF THE INVENTION

1. Field of the Invention

The present invention is related to the area of image display, particularly related to techniques for dynamically regulating brightness of backlighting in display device (e.g., a mobile device, a laptop and a television).

2. Description of Related Art

More and more mobile devices (e.g., a mobile phone, a personal digital assistant (PDA) and the like) can support multimedia functions, such as displaying an electronic book, playing a three dimensional game, viewing pictures or watching a video. Hence, image quality for the display on the mobile devices has become one of the selling factors to gain popularity among consumers.

Brightness exhibited in the real environment has a very broad dynamic range. A visual system in human eyes can only sense the brightness of about five orders of magnitude in the brightness dynamic range of the real environment. A mobile display device generally has lower image contrast and usually cannot be adaptive to the ambient light changes largely due to the limitation in hardware. For example, an image displayed on a mobile phone may be too dark to see the details in the relatively dark areas of the image when in a bright environment such as outdoors with bright sunshine. Furthermore, the liquid crystal material of the display device in a mobile phone cannot block the backlighting completely under the dark environment, so that a dark state light leakage phenomenon may occur in the dark areas of the image to cause the reduction of the image contrast.

A conventional method is to regulate the brightness of the backlighting manually, typically by a user. For example, the brightness of the backlighting in some mobile phones is divided into several levels for the user to adjust. However, such a control manner is troublesome to use. Furthermore, a superior display quality cannot be achieved only by enhancing the brightness of the backlighting in the bright environment. Moreover, the power for the mobile device may not be efficiently used in a dark environment.

Therefore, techniques for regulating the backlighting brightness under all lighting conditions are desired. As such, a mobile display device with a low dynamic range is able to display a high dynamic range and a good visual effect. Further such a mobile display device can save power, thereby prolonging the use of an internal battery.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention is related to dynamically regulating brightness of backlighting in display devices. According to one aspect of the present invention, the brightness dynamic range of a display device is adjusted according to a current ambient light. In other words, the original brightness dynamic range of the display image is mapped to the brightness dynamic range suitable for human eyes under the current ambient light conditions, and then the brightness of the display image is corrected according to a histogram to enhance the contrast and details of the display image, thereby a high quality image can be presented on a display under the current ambient light conditions.

The present invention may be implemented in many forms as a method, an apparatus, or a part of system. According to one embodiment, the present invention is a method for dynamically regulating brightness of backlighting in a display device. The method comprises determining a brightness dynamic range suitable for human eyes under a current environment according to a current environmental brightness and an original brightness dynamic range of a display image; regulating an original brightness value of each pixel of the display image into a regulated brightness value suitable for the human eyes according to the original brightness dynamic range of the display image and the brightness dynamic range suitable for the human eyes under the current environment; and correcting the regulated brightness value of each pixel of the display image into a corrected brightness value according to a histogram of the regulated brightness value of the display image.

According to another embodiment, the present invention is a device for dynamically regulating brightness of backlighting, the device comprises: an adaptive brightness regulation module provided for determining a brightness dynamic range suitable for human eyes under current environment according to a current environmental brightness and an original brightness dynamic range of a display image, and regulating an original brightness value of each pixel of the display image into a regulated brightness value suitable for the human eyes according to the original brightness dynamic range of the display image and the brightness dynamic range suitable for the human eyes under the current environment; and a histogram regulation module provided for correcting the regulated brightness value of each pixel of the display image into a corrected brightness value according to a histogram of the regulated brightness value of the display image.

One of the features, benefits and advantages in the present invention is to provide techniques for dynamically regulating brightness of backlighting in display devices to present a display optimized for the current viewing conditions.

Other objects, features, and advantages of the present invention will become apparent upon examining the following detailed description of various embodiments thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

The present invention can be suitable for various display devices, particularly for mobile display devices, such as a mobile phone, a PDA (personal digital assistant), a digital camera and the like. The present invention can adaptively regulate brightness of backlighting in a display device. Thereby, a display device using one embodiment of the present invention can display a high dynamic range (HDR) and images/videos of high quality, and use power effectively at the same time.

A dynamic range refers to a ratio of the highest value to the lowest value of a signal. In simple terms, an HDR can be summarized as follows: 1) bright parts can be very bright; 2) dark areas can be very dark; 3) details of the bright parts and the dark areas both are visually presented or clearly visible.

Figure 1:
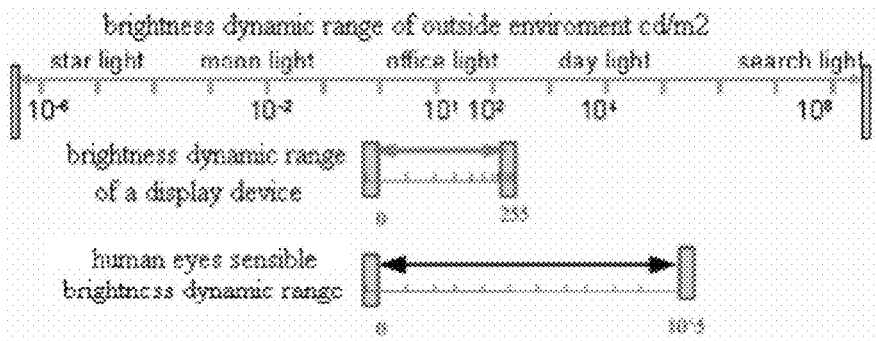
FIG. 1 is a schematic diagram showing three different dynamic ranges.

FIG. 1 is a schematic diagram showing three different brightness dynamic ranges. The visual system in the human eyes can sense the ambient brightness in about five orders of magnitude. In addition to seeing pictures displayed on a display device, the human eyes can also be exposed to the surroundings beyond the display device. Under a bright outdoor environment, a sensible brightness dynamic range for human eyes tends to move rightwards, and the brightness dynamic range of the display device is compressed to a dark side of the sensible brightness dynamic range for human eyes. Thus the visual system of the human eyes fails to fully restore the pictures displayed on the display device, thus many details of the pictures displayed on the display devices become dark and undistinguishable. Under a dark environment, the sensible brightness dynamic range for human eyes tend to move leftwards and the brightness dynamic range of the display device is compressed to a right side of the sensible brightness dynamic range for human eyes, thereby leading to power waste in the display device.

Figure 2:
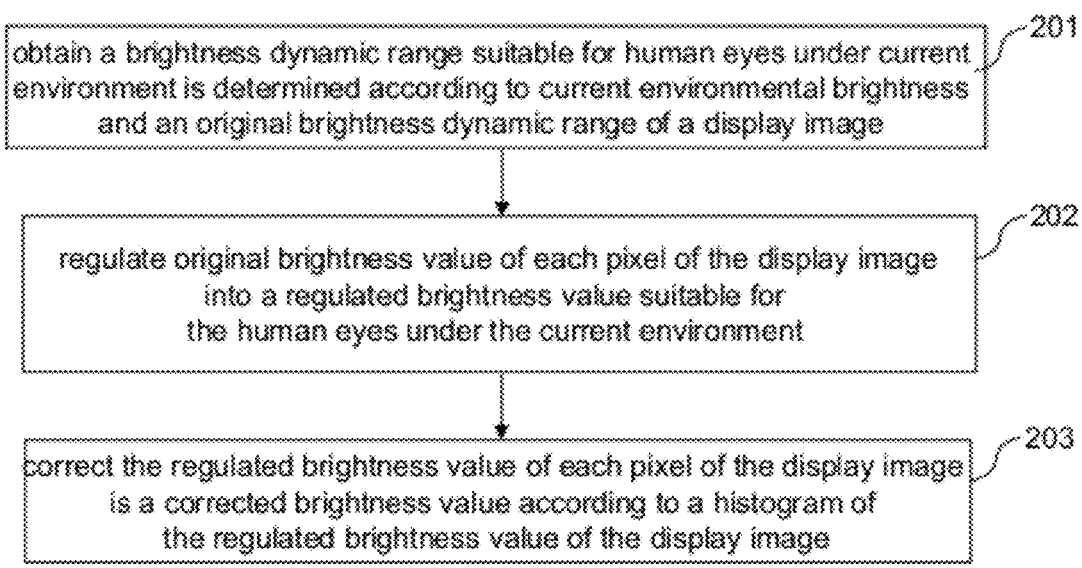
FIG. 2 is a flow chart showing a method for dynamically regulating brightness of backlighting according to one embodiment of the present invention.

To solve the problem mentioned above, one embodiment of the present invention is to adjust the brightness dynamic range of a display device according to the current ambient lighting conditions. In order words, the original brightness dynamic range of the display image is mapped to the brightness dynamic range suitable for human eyes under the current ambient lighting conditions. Then the brightness of the display image is corrected according to a histogram to enhance the contrast and details of the display image, thus a high quality image can be presented in the current ambient lighting conditions FIG. 2 is a flowchart or a process 200 of dynamically regulating the brightness of backlighting in a display device according to one embodiment of the present invention. The process 200 may be implemented in software, hardware or a combination of both. In one embodiment, a software module is implemented according to the process 200 and executed by a processor in a mobile device with a display device illuminated by backlighting (e.g., LCD).

At 201, a brightness dynamic range suitable for the human eyes under the current ambient lighting conditions is determined according to an original brightness dynamic range of a display image. Depending on implementation, the display device may employ a photosensor such as a photoresistor or other light sensitive devices to sense the ambient lighting conditions or current environmental brightness.

At 202, an original brightness value of each pixel of the display image is regulated to a regulated brightness value suitable for the human eyes according to the original brightness dynamic range of the display image and the brightness dynamic range suitable for the human eyes under the current ambient lighting conditions.

In one embodiment, a full mapping algorithm is used to regulate the original brightness value of each pixel of the display image into a regulated brightness value suitable for the human eyes. The full mapping algorithm maps each pixel of the display image to a displayed image via a point-to-point corresponding function (curve). The mapping algorithm is characterized by one-to-one, i.e., the pixels in the original image with the same value are mapped into the same values of the displayed image. The mapping algorithm has advantages of fast computation and maintaining excellent overall bright/dark effects.

In one embodiment, the regulated brightness value can be calculated based on the following formula:

$$D(I) = (D_{max} - D_{min}) * \frac{\log(I + \tau) - \log(I_{min} + \tau)}{\log(I_{max} + \tau) - \log(I_{min} + \tau)} + D_{min},$$

where, I is the original brightness value, D(I) is corresponding regulated brightness value, $I_{max}$ and $I_{min}$ are the maxima value and the minimal value of the original brightness respectively, $D_{max}$ and $D_{min}$ are the maximal value and the minimal value of the brightness suitable for human eyes respectively, and $\tau$ is a mapping regulation parameter and ranges from 0 to $\infty$.

For example, under the bright outdoor environment, when the current environmental brightness sensed by the photosensor is larger than a reference brightness, the brightness values of the pixels in dark areas of the display image need to be raised. It is assumed that the original brightness dynamic range of the display image is [0, 255], the brightness dynamic range suitable for the human eyes under the current environment is [120, 255], so $I_{max}=255$, $I_{min}=0$, $D_{max}=255$ and $D_{min}=120$. Thus, the regulated brightness value D(I) suitable for the human eyes corresponding to the original brightness value I of each pixel can be calculated based on the above formula. For example, the pixels with the original brightness value being from 0 to 50 are mapped into the regulated brightness value 120 suitable for the human eyes, and the pixels with the original brightness value being 60 are mapped to the regulated brightness value 125 suitable for the human eyes.

Under a dark environment, when the current environmental brightness sensed by the photosensor is smaller than the reference brightness, the brightness values of the pixels in bright areas of the display image need to be lowered. It is assumed that the brightness dynamic range suitable for the human eyes under the current environment is [0, 200], so $I_{max}=255$, $I_{min}=0$, $D_{max}=200$ and $D_{min}=0$. Thus, the regulated brightness value D(I) suitable for the human eyes corresponding to the original brightness value I of each pixel can be calculated based on the above formula. For example, the pixels with the original brightness value being from 200 to 255 are mapped into the regulated brightness value 200 suitable for the human eyes, and the pixels with the original brightness value being 100 are mapped to the regulated brightness value 150 suitable for the human eyes. Such a way of reducing the original brightness value of the display image according to the environmental brightness is favorable for saving power efficiently, thereby prolonging a use cycle of a battery powering the mobile display device.

Figure 3:
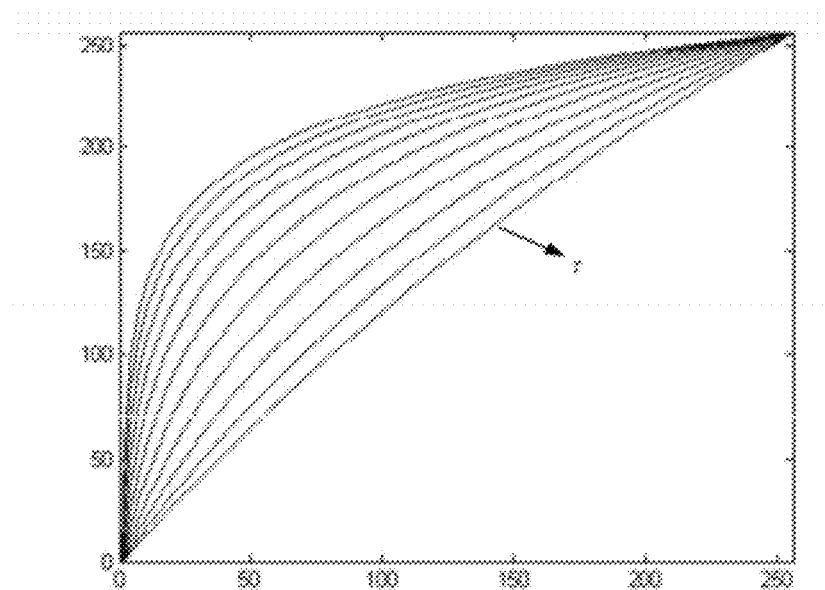
FIG. 3 is a schematic diagram of a mapping curve.

FIG. 3 is a schematic diagram of mapping curves. As shown in FIG. 3, each τ corresponds to a mapping curve. It can be seen that D(I)=I when τ→∞. A gradient of the mapping curve is steeper at low gray level when τ→0. Hence, the details of the dark areas can be displayed more visibly. However, the other gray levels after mapping are compressed, thereby causing reduction of image contrast. Hence, the regulated brightness value requires to be further corrected according to one embodiment of the present invention.

Referring back to FIG. 2, at 203, the regulated brightness value of each pixel of the display image is corrected to a corrected brightness value according to a histogram of the regulated brightness value of the display image.

Depending on implementation, the correction of the corrected brightness values comprises the following operations: A1, one or more first midpoints which linearly divide current $2^{n-1}$ brightness ranges of the regulated brightness value of the display image into $2^n$ brightness ranges are determined. A2, one or more second midpoints which divide current $2^{n-1}$ brightness ranges of the histogram of the regulated brightness value of the display image into $2^n$ brightness ranges symmetrically according to the number of the pixels are determined. A3, one or more brightness correction points are calculated according to the first midpoints and the second midpoints. A4, the $2^{n-1}$ brightness ranges of the regulated brightness value of the display image are divided into the $2^n$ brightness ranges again according to endpoints of the current $2^{n-1}$ brightness ranges and the brightness correction points.

Then, n=n+1 is set and A1-A4 operations described above are repeated until n is equal to a bit number of the display image, wherein an initial value of n is 1. When n is equal to the bit number of the display image, the corrected brightness value corresponding to the regulated brightness value of the pixels of the display image within one brightness range is set to be equal to a brightness value of one endpoint of the one brightness range.

In one embodiment, a calculation formula of the brightness correction points may be $le_{N/2}=l_{N/2}+\beta(e_{N/2}-l_{N/2})$, where $l_{N/2}$ is one of the first midpoints, $e_{N/2}$ is one of the second midpoints, β is a mapping curve correction parameter and ranges from 0 to 1, and $N=2^n$.

For example, provided that the display image is an 8-bit image, i.e., the bit number of the display image is 8. Thus, the corrected brightness values can be calculated by 8 iterations. The first iteration is described hereafter.

S11, the first midpoint $l_{N/2}$ which divides the regulated brightness value D(I) of the current display image into 2 brightness ranges with the same length is determined. For example, the first midpoint $l_{N/2}$ may be 127 if D(I) ranges from 0 to 255.

S12, the second midpoint $e_{N/2}$ which divides the regulated brightness value D(I) into 2 brightness ranges with the same pixel distribution probability is determined based on the histogram constructed by the regulated brightness value D(I). E.g. the second midpoint $e_{N/2}$ may be 155.

S13, the brightness correction point $le_{N/2}$ is calculated according to $le_{N/2}=l_{N/2}+\beta(e_{N/2}-l_{N/2})$. Provided that the brightness correction point $le_{N/2}$ is 130 when the first midpoint is 127 and the second midpoint is 155.

Thus, two brightness ranges [0, 130] and [130, 255] are formed after the first times iteration. Then, the second iteration is described hereafter.

S21, two first midpoints $l_{N/2}$ which divide the two brightness ranges of the regulated brightness value D(I) into four brightness ranges with the same length respectively are determined. For example, the first midpoint of the brightness range [0, 130] is 64 and the first midpoint of the brightness range [130, 255] is 192.

S22, two second midpoints $e_{N/2}$ which divide the two brightness ranges of the regulated brightness value into four brightness ranges with the same pixel distribution probability are determined based on the histogram constructed by the regulated brightness value D(I). For example, the second midpoint of the brightness range [0, 130] is 78 and the second midpoint of the brightness range [130, 255] is 206.

S23: corresponding brightness correction points $le_{N/2}$ are calculated. It is assumed that the result calculated according to the first midpoint 64 and the second midpoint 78 is 72, and the result calculated according to the first midpoint 192 and the second midpoint 206 is 200.

Thus, four brightness ranges [0, 72], [72, 130], [130, 200] and [200, 255] are formed after the second iteration.

After the 8 iterations as described above, a previous distribution of the regulated brightness value of the pixels in the range from 0 to 255 is corrected into a new distribution of the corrected brightness values. For example, the pixels originally in the brightness range [0, 1] are possibly corrected into the brightness range [1, 2]. A brightness value of anyone endpoint of the brightness range can be assigned to the pixels as the brightness value thereof.

One of the features, benefits and advantages in the present invention is that an optimization can be found between linear mapping and histogram equalization. The dynamic range image with better visual effect, abundant details and moderate contrast is obtained by using adaptive linear histogram equalization technology in one embodiment.

According to another embodiment, in order to further ensure a display of color images without color dissertation, the method for dynamically regulating the brightness of the backlighting may further comprise the following operation: calculating output color components of each pixel according to the corrected brightness value of each pixel of the display image. It is well known that a color component includes an R component, a G component and a B component. Accordingly, the operation of calculating output color components of each pixel comprises the following operations.

B1, an input R component, an input G component and an input B component of the original brightness value of each pixel of the display image are calculated.

B2, the mapped regulated brightness value suitable for the human eyes is looked up according to the original brightness value, and corresponding corrected brightness values are obtained according to the regulated brightness value suitable for the human eyes.

B3, an output R component, an output G component and an output B component of each pixel of the display image are calculated respectively according to the corrected brightness value, the input R component, the input G component and the input B component.

In one embodiment, the output R component, the output G component and the output B component are calculated according to following formulas:

$$R_{out} = \left(\frac{R_{in}}{L_{in}}\right)^\gamma L_{out},$$

$$G_{out} = \left(\frac{G_{in}}{L_{in}}\right)^\gamma L_{out},$$

$$B_{out} = \left(\frac{B_{in}}{L_{in}}\right)^\gamma L_{out},$$

where $R_{in}$, $G_{in}$ and $B_{in}$ are the input R component, the input G component and the input B component of each pixel of the display image respectively, $R_{out}$, $G_{out}$ and $B_{out}$ are the output R component, the output G component and the output B component of each pixel of the display image respectively, $L_{in}$ is the original brightness value of each pixel of the display image, $L_{out}$ is the corrected brightness value, and γ typically ranges from 0.5 to 1.

When $$\left(\frac{R_{in}}{L_{in}}\right)^\gamma > 1$$

and $L_{out}$=255, i.e., the pixels cross a boundary, $R_{out}$ can be clamped in the range of [0, 255]. It should be noted that generating and regulating the brightness mapping curve by the full mapping algorithm mentioned above is used as an example only. Those skilled in the art that other mappings such as a local mapping technique may be applicable.

Figure 4:
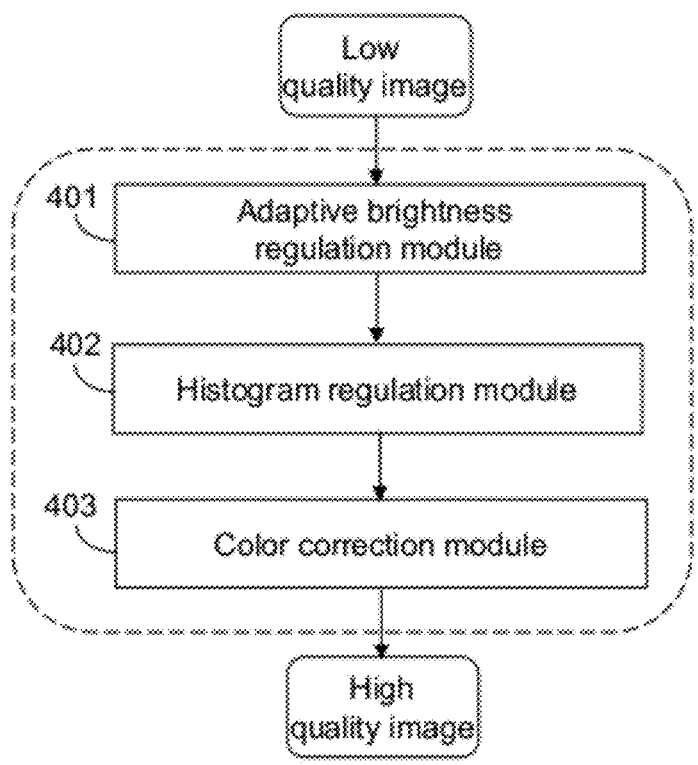
FIG. 4 is a block diagram showing a device for dynamically regulating the brightness of the backlighting according to one embodiment of the present invention.

FIG. 4 is a block diagram showing a device for dynamically regulating the brightness of the backlighting according to one embodiment of the present invention. Referring to FIG. 4, the device comprises the following modules.

An adaptive brightness regulation module 401 is provided for determining a brightness dynamic range suitable for human eyes under current environment according to a current environmental brightness and an original brightness dynamic range of a display image, and regulating an original brightness value of each pixel of the display image into a regulated brightness value suitable for the human eyes according to the original brightness dynamic range of the display image and the brightness dynamic range suitable for the human eyes under the current environment.

A histogram regulation module 402 is provided for correcting the regulated brightness value of each pixel of the display image into a corrected brightness value according to a histogram of the regulated brightness value of the display image.

In one embodiment, the regulated brightness value suitable for the human eyes can be calculated based on the following formula:

$$D(I) = (D_{max} - D_{min}) * \frac{\log(I + \tau) - \log(I_{min} + \tau)}{\log(I_{max} + \tau) - \log(I_{min} + \tau)} + D_{min},$$

where I is the original brightness value, D(I) is corresponding regulated brightness value, $I_{max}$ and $I_{min}$ are the maxima value and the minimal value of the original brightness respectively, $D_{max}$ and $D_{min}$ are the maximal value and the minimal value of the brightness suitable for human eyes respectively, and τ is a mapping regulation parameter and ranges from 0 to ∞.

In one embodiment, the histogram regulation module 402 further comprises the following sub-modules.

A first midpoint calculation sub-module is provided for determining one or more first midpoints which linearly divide current $2^{n-1}$ brightness ranges of the regulated brightness value of the display image into $2^n$ brightness ranges.

A second midpoint calculation sub-module is provided for determining one or more second midpoints which divide the current $2^{n-1}$ brightness ranges of the histogram of the regulated brightness value of the display image into $2^n$ brightness ranges symmetrically according to the number of the pixels.

A brightness correction point calculation sub-module is provided for calculating one or more brightness correction points according to the first midpoints and the second midpoints.

A brightness range dividing sub-module is provided for dividing the current $2^{n-1}$ brightness ranges of the regulated brightness value of the display image into the $2^n$ brightness ranges according to endpoints of the current $2^{n-1}$ brightness ranges and the brightness correction points.

A cycle control sub-module is provided for setting n=n+1 and repeating above operations until n is equal to a bit number of the display image, wherein an initial value of n is 1.

The corrected brightness value corresponding to the regulated brightness value of the pixel of the display image within one brightness range is set to be equal to a brightness value of one endpoint of the one brightness range when n is equal to the bit number of the display image.

Specifically, the brightness correction points can be obtained according to the following formula: $le_{N/2} = l_{N/2} + \beta (e_{N/2} - l_{N/2})$, wherein $l_{N/2}$ is one of the first midpoints, $e_{N/2}$ is one of the second midpoints, β is a mapping curve correction parameter and ranges from 0 to 1, and the number of the brightness ranges after n times division.

In a preferred embodiment, the device shown in FIG. 4 further comprises a color correction module 403 provided for calculating output color components of each pixel according to the corrected brightness value of each pixel of the display image. The color components can include an R component, a G component and a B component. The color correction module 403 further comprises the following sub-modules.

An original color component calculation sub-module is provided for calculating an input R component, an input G component and an input B component of the original brightness value of each pixel of the display image.

A corrected brightness searching sub-module is provided for looking up the regulated brightness value suitable for the human eyes according to the original brightness value, and obtaining corresponding corrected brightness value according to the regulated brightness value suitable for the human eyes.

An output color component calculation sub-module is provided for calculating the output R component, the output G component and the output B component respectively according to the corrected brightness value, the input R component, the input G component and the input B component.

Specifically, the output color components can be obtained according to the following formulas:

$$R_{out} = \left(\frac{R_{in}}{L_{in}}\right)^\gamma L_{out},$$

$$G_{out} = \left(\frac{G_{in}}{L_{in}}\right)^\gamma L_{out},$$

$$B_{out} = \left(\frac{B_{in}}{L_{in}}\right)^\gamma L_{out},$$

where $R_{in}$, $G_{in}$ and $B_{in}$ are the input R component, the input G component and the input B component of each pixel of the display image respectively, $R_{out}$, $G_{out}$ and $B_{out}$ are the output R component, the output G component and the output B component of each pixel of the display image respectively, $L_{in}$ is the original brightness value of each pixel of the display image, $L_{out}$ is the corrected brightness value, and typically ranges from 0.5 to 1.

Thus, the low quality input image processed by the adaptive brightness regulation module 401, the histogram regulation module 402 and the color correction module orderly becomes the high quality output image.

Depending on implementation, the device and the method for dynamically regulating the brightness of the backlighting can be implemented on a mobile display device employed with a photosensor such as an external photoresistance sensing the environmental brightness in real-time.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A method for dynamically regulating a display image for human eyes to view on a display device under current ambient viewing conditions, the method comprising:
   determining an original dynamic range of the display image;
   determining a dynamic range suitable for human eyes under the current ambient viewing conditions according to the original dynamic range;
   regulating an original brightness value of each pixel of the display image to a regulated brightness value suitable for the human eyes according to the original dynamic range of the display image and the dynamic range suitable for human eyes under the current ambient viewing conditions; and
   correcting the regulated brightness value of each pixel of the display image to a corrected brightness value according to a histogram determined from the regulated brightness value of each pixel of the display image;
   wherein said correcting the regulated brightness value of each pixel of the display image to a corrected brightness value comprises;
   determining one or more first midpoints linearly dividing current $2^{n-1}$ brightness ranges of the regulated brightness value of the display image into $2^n$ brightness ranges;
   determining one or more second midpoints dividing the current $2^{n-1}$ brightness ranges of the histogram into $2^n$ brightness ranges symmetrically according to a number of pixels in the display image; calculating one or more brightness correction points according to the first midpoints and the second midpoints;
   dividing the current $2^{n-1}$ brightness ranges of the regulated brightness value of the display image into the $2^n$ brightness ranges according to endpoints of the current $2^{n-1}$ brightness ranges and brightness correction points;
   setting n=n+1 and repeating above operations until n is equal to a bit number of the display image, wherein an initial value of n is 1; and setting the corrected brightness value corresponding to the regulated brightness value of the pixel of the display image within one brightness range to be equal to a brightness value of one endpoint of the one brightness range when n is equal to the bit number of the display image.

2. The method according to claim 1, wherein the display image is displayed on the display device according to the current ambient viewing conditions, where the display image is dynamically adjusted when the current ambient viewing conditions change to present a displayed image with proper contrast and details.

3. The method according to claim 1, wherein said calculating one or more brightness correction points according to the first midpoints and the second midpoints is based on a formula: $le_{N/2} = l_{N/2} + \beta(e_{N/2} - l_{N/2})$, wherein $l_{N/2}$ is one of the first midpoints, $e_{N/2}$ is one of the second midpoints, $\beta$ is a mapping curve correction parameter and ranges from 0 to 1, and N is the number of the brightness ranges after n times division.

4. The method according to claim 1, further comprising: calculating output color components of each pixel according to the corrected brightness value of each pixel of the display image.

5. The method according to claim 4, wherein each of the color components includes an R component, a G component and a B component, and wherein said calculating output color components of each pixel comprises:
   calculating an input R component, an input G component and an input B component of the original brightness value of each pixel of the display image;
   looking up the regulated brightness value suitable for the human eyes according to the original brightness value;
   obtaining corresponding corrected brightness value according to the regulated brightness value suitable for the human eyes; and
   calculating the output R component, the output G component and the output B component respectively according to the corrected brightness value, the input R component, the input G component and the input B component.

6. The method according to claim 1, wherein the regulated brightness value suitable for the human eyes is calculated according to:

$$D(I) = (D_{max} - D_{min}) * \frac{(\log(I + T) - \log(I_{min} + T))}{(\log(I_{max} + T) - \log(I_{min} + T))} + D_{min}$$

wherein I is the original brightness value, D(i) is the corresponding regulated brightness value, $l_{max}$ and $l_{min}$ are the maxima value and the minimal value of the original brightness respectively, $D_{max}$ and $D_{min}$ are the maximal value and the minimal value of the brightness suitable for human eyes respectively, and T is a mapping regulation parameter and ranges from 0 to ∞.

7. A device for dynamically regulating brightness of a display image for human eyes to view under current ambient viewing conditions, the device comprising;
   a display;
   a sensor to sense the current ambient viewing conditions;
   an adaptive brightness regulation module provided for determining a brightness dynamic range suitable for human eyes under the current ambient viewing conditions according to an original dynamic range of the display image, and regulating an original brightness value of each pixel of the display image into a regulated value suitable for the human eyes according to the original dynamic range of the display image and the dynamic range suitable for the human eyes under the current environment; and
   a histogram regulation module provided for correcting the regulated brightness value of each pixel of the display image into a corrected brightness value according to a histogram of the regulated brightness value of the display image;

wherein the histogram regulation module comprises;

a first midpoint calculation sub-module provided for determining one or more first midpoints which linearly divide current $2^{n-1}$ brightness ranges of the regulated brightness value of the display image into $2^n$ brightness ranges;

a second midpoint calculation sub-module provided for determining one or more second midpoints which divide the current $2^{n-1}$ brightness ranges of the histogram of the regulated brightness value of the display image into $2^n$ brightness ranges symmetrically according to the number of the pixels;

a brightness correction point calculation sub-module provided for calculating one or more brightness correction points according to the first midpoints and the second midpoints;

a brightness range dividing sub-module provided for dividing the current $2^{n-1}$ brightness ranges of the regulated brightness value of the display image into the $2^n$ brightness ranges according to endpoints of the current $2^{n-1}$ brightness ranges and the brightness correction points; and a cycle control sub-module provided for setting n=n+1 and repeating above operations until n is equal to a bit number of the display image, wherein an initial value of n is 1; and wherein the corrected brightness value corresponding to the regulated brightness value of the pixel of the display image within one brightness range is set to be equal to a brightness value of one endpoint of the one brightness range when n is equal to the bit number of the display image.

8. The device according to claim 7, further comprising: a color correction module provided for calculating output color components of each pixel according to the corrected brightness value of each pixel of the display image.

9. The device according to claim 8, wherein the color components can include an R component, a G component and a B component, and the color correction module further comprises:

an original color component calculation sub-module provided for calculating an input R component, an input G component and an input B component of the original brightness value of each pixel of the display image;

a corrected brightness searching sub-module provided for looking up the regulated brightness value suitable for the human eyes according to the original brightness value, and obtaining corresponding corrected brightness value according to the regulated brightness value suitable for the human eyes;

an output color component calculation sub-module provided for calculating the output R component, the output G component and the output B component respectively according to the corrected brightness value, the input R component, the input G component and the input B component.

* * * * *